Figure 1:
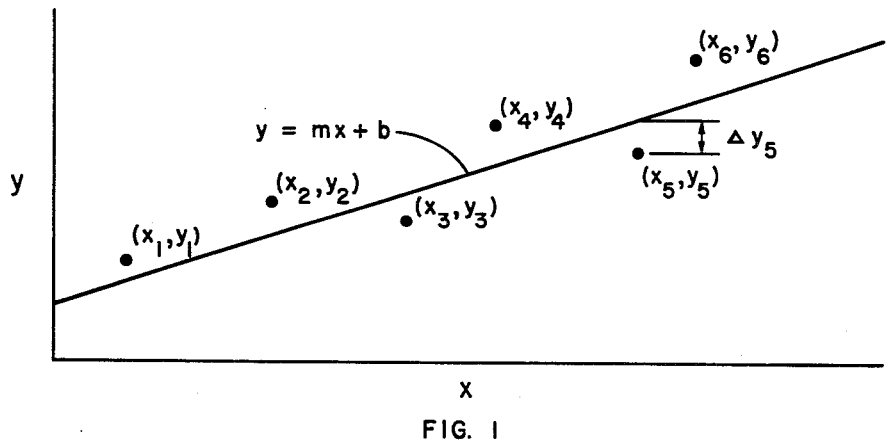

Oct. 27, 1964  K. N. BURNS  3,154,678
ANALOG DEVICE FOR LEAST SQUARES FITTING
Filed Sept. 2, 1959  3 Sheets-Sheet 1

Kay N. Burns  Inventor
By  Attorney 3,154,678
ANALOG DEVICE FOR LEAST SQUARES FITTING
Kay N. Burns, Tulsa, Okla., assignor to Jersey Production
Research Company, a corporation of Delaware
Filed Sept. 2, 1959, Ser. No. 837,755
12 Claims. (Cl. 235—180)

The present invention relates to the interpretation and analysis of experimental data and more particularly relates to analog methods and apparatus for more precisely defining the relationship between two interrelated variable represented by experimental data points. In a preferred embodiment, the invention relates to an analog system for fitting a set of experimental data points to a straight line with a minimum of deviation and with greater rapidity than has been possible heretofore.

In studying physical systems, it is common practice to plot experimental data showing the relationship between variables in a system upon a set of rectangular coordinates in order to derive an equation which will express one variable in terms of another. It frequently happens that data thus plotted indicate that the relationship between the variables selected is a linear or simple curvilinear one but that the plotted points do not fall exactly upon a straight line or simple curve because of experimental error or for other reasons. In such a situation, statistical methods are generally resorted to for determining the equation of the line or curve which will express the relationship between the variables with a minimum deviation between the experimental points and corresponding points on hte line or curve. Several different statistical methods for doing this have been developed. The best known and most widely used of these systems is the method of least squares. This method, when applied to linearly related variables, is based upon the fact that the line best defining the relationship between the variables must satisfy two separate requirements. The first of these requirements is that the sum of the deviations between experimental values of the dependent variable and corresponding values taken from the line best fitting the experimental points must be zero. The second requirement is that the sum of the first moments of the deviations about the Y-axis of the co-ordinate system upon which the data are plotted, i.e., the sum of the products of each deviation between the dependent variable and the line best defining the relationship between the variables times the corresponding value of the independent variable, must also be zero. By solving equations reflecting these two requirements, values which permit derivation of the line best fitting the experimental data points can readily be obtained. By going one step further and letting the second moments of the deviations about the Y-axis equal zero, the method can readily be applied to variables related by higher order equations.

The application of the method of least squares requires that a series of computations be made for each point in the data to which the line or curve is to be fitted. Although these computations are relatively simple, they are nevertheless time consuming. In some cases it has been found that high speed digital computers can be employed to carry out such computations and thus permit derivation of the equation best defining the relationship between variables by the least squares method more quickly than if the computations were carried out manually. In general, however, the use of digital computers is practical only where the method of least squares is to be employed to derive complex equations invloving a number of variables. Where a straight line or simple curve is to be derived on the basis of relatively few data points, the time required for programming a digital computer to perform the necessary computations generally offsets any savings in actual computation time made possible through the use of the computer. For this reason, the use of digital computers for deriving equations between interrelated variables has been somewhat limited.

The present invention provides a method and apparatus which permit application of the method of least squares to the problem of defining the relationship between related variables much more readily than has been possible heretofore. In accordance with the invention, it has now been found that the equations involved in the method of least squares can be represented as simultaneous equations in an analog-type device and readily solved for values which define the line or curve best expressing the relationship between data points obtained experimentally. By providing circuits in the analog device which correspond to the least squares equations and representing variations in the coefficients of those equations by variations in voltages applied to the circuits, values of the coefficients which best define the desired line or curve can quickly be obtained. It is merely necessary to measure the output voltage from each circuit while varying the input voltages representing the coefficients and to select those coefficient values which result in zero output voltage values. The coefficient values thus determined define the line or curve which best expresses the relationship between the variables involved in the experimental data under consideration. The method and apparatus of the invention are particularly useful where data based in part upon a limited number of values for one variable must be handled repeatedly. One example of this occurs in the analysis of information obtained during seismic prospecting. Normally a limited number of geophones spaced at given distances from the shot point are used in such prospecting. In situations where geophone location represents one variable, the same set of values may thus be used repeatedly. The method and apparatus of the invention are attractive under such circumstances.

Figure 2:
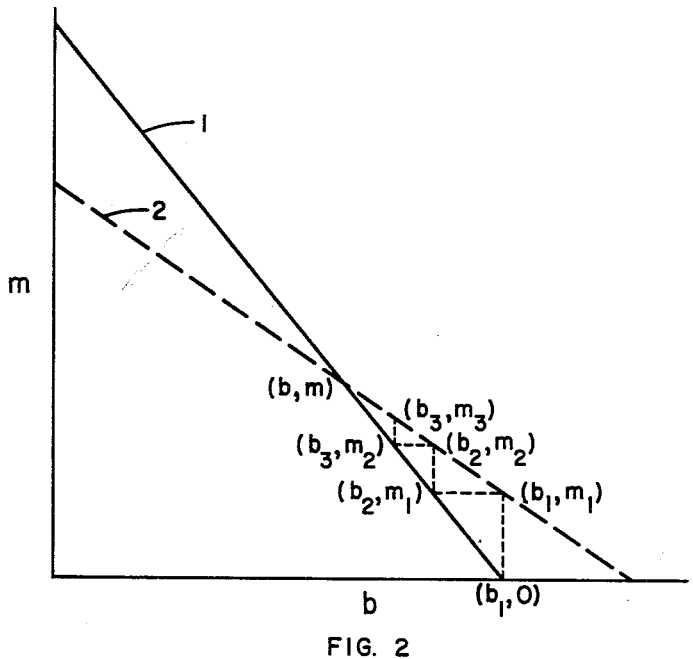
Figure 3:
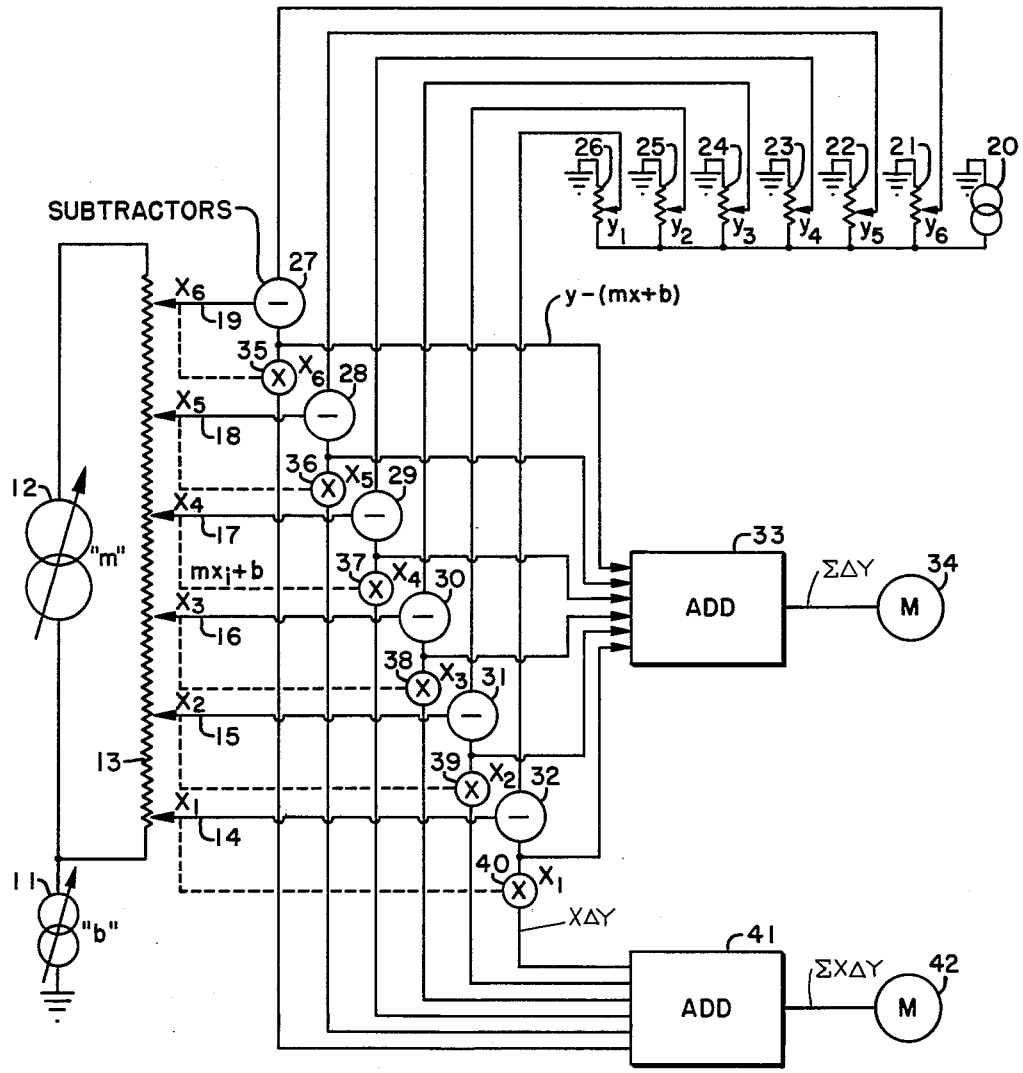
Figure 4:
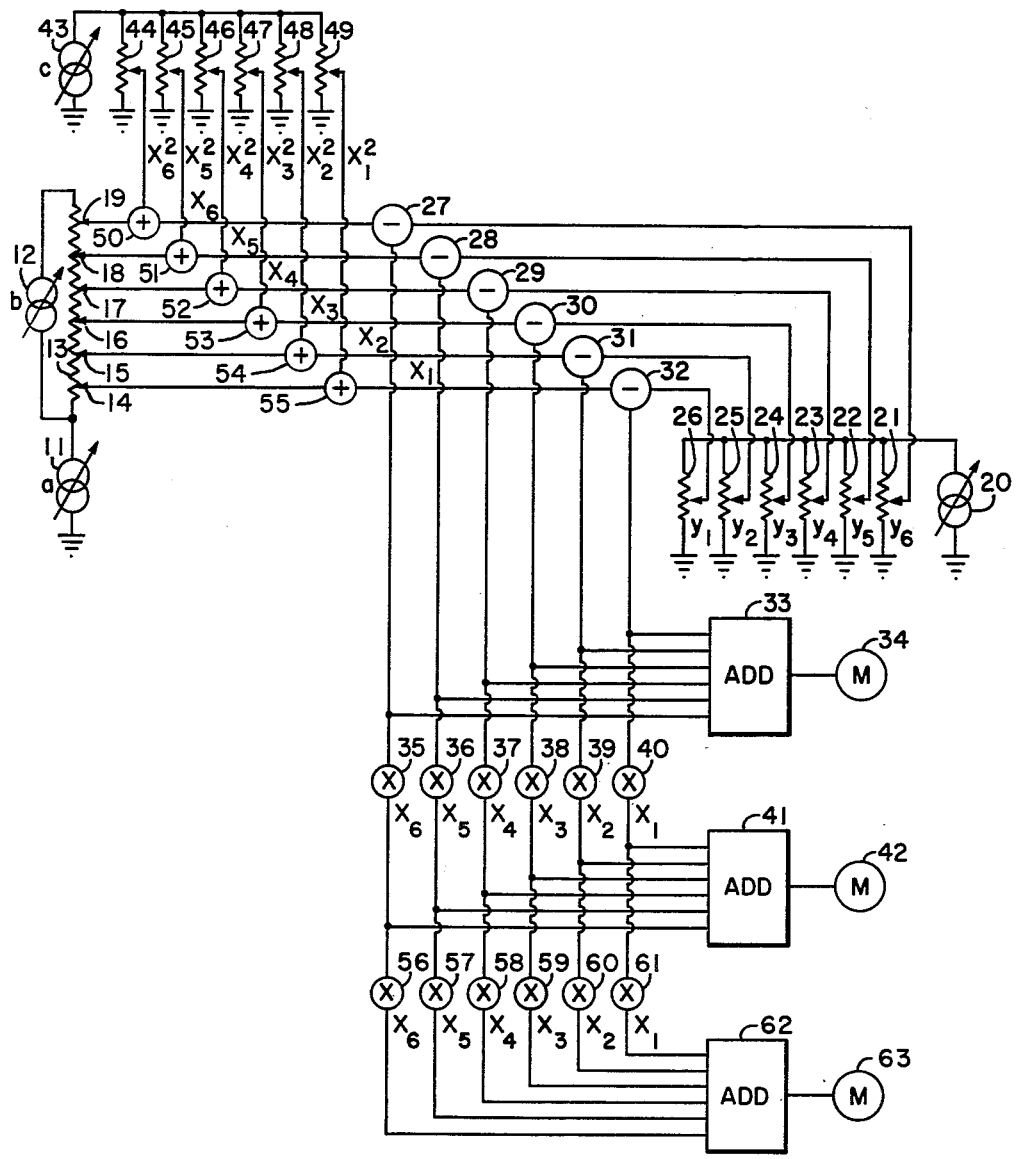

The exact nature and objects of the invention can be more fully understood from the following description and the accompanying drawings, in which:

FIG. 1 is a graph of a straight line applied to a set of experimental data points plotted on rectangular coordinates which will be useful in understanding the invention;

FIG. 2 graphically illustrates the method of least squares as carried out in accordance with the invention;

FIG. 3 is a schematic diagram of an analog device useful for fitting a straight line to a set of data points by the method of the invention; and, FIG. 4 schematically represents an analog device suitable for fitting a higher order curve to a set of points in accordance with the invention.

Turning first to FIG. 1, a series of experimental data points designated as $x_1$, $y_1$; $x_2$, $y_2$; . . . $x_6$, $y_6$ have been plotted on a system of rectangular coordinates. Experimental values of the independent variable $x$ are represented on the abscissa; while corresponding values of the dependent variable $y$ are represented on the ordinate. The locations of the points indicate that the variables $x$ and $y$ are obviously linearly related, although the points do not fall exactly upon a single straight line. The relationship between the variables can therefore be expressed by a straight line having the general equation $y=mx+b$ where $m$ is the slope of the line and $b$ is its intercept on the $y$ axis. The line which best defines this relationship must have a slope and intercept such that the sum of deviations along the ordinate between each experimental point and the corresponding point on the line, $\Sigma \Delta y$, will be zero. Since these deviations will in part be positive and in part negative deviations, this requirement alone will not define the location of the line. A number of lines located such that the sum of the positive and negative deviations totaled zero might be drawn. By providing that the square of these deviations must also be minimum, the cancelling of positive and negative values by one another can be eliminated and an absolute minimum for the sum of the squared deviations can be obtained. This accounts for the name, "method of least squares."

The requirement that the sum of the squares of the deviations between the experimental values of the dependent variable and the corresponding points on the line best representing the relationship between the variables be a minimum can be expressed mathematically as follows:

$$\sum_{i=1}^{n} [y_i - (mx_i + b)]^2 = \text{a minimum}$$

The partial derivatives of this expression with respect to $m$ and $b$ must be zero and hence the following equations are obtained:

$$\sum_{i=1}^{n} [y_i - (mx_i + b)]^2 = G(m, b)$$

$$\frac{\partial G}{\partial b}(m, b) = 2\sum_{i=1}^{n} [y_i - (mx_i + b)(-1)] = 0$$

$$\frac{\partial G}{\partial m}(m, b) = 2\sum_{i=1}^{n} [y_i - (mx_i + b)(-x_i)] = 0$$

Multiplying each of the above differential equations by minus one-half and letting $\Delta y_i = y_i - (mx_i + b)$, the following equations are obtained:

(1) $\Sigma y_i - (mx_i + b) = \Sigma \Delta y_i = 0$
(2) $\Sigma [y_i - (mx_i + b)][x_i] = \Sigma x_i \Delta y_i = 0$ The above equations show that the sum of deviations between the experimental values of the dependent variable and corresponding points on the line best defining the linear relationship between the variables will be zero and that the sum of the first moments of those deviations about y axis will also be zero.

The last two equations set forth above are solved in accordance with the invention by considering them as linear simultaneous equations in $m$, the slope of the line best defining the relationship between the variables $x$ and $y$, and $b$, the intercept of that line on the $y$ axis. If the equations are plotted in terms of $m$ and $b$, letting $m$ represent ordinate values and $b$ represent values along the abscissa as shown in FIG. 2 of the drawing, the result will be two straight lines which intersect at values of $m$ and $b$ satisfying the equation of the line which best reflects the linear relationship between variables $x$ and $y$. The invention utilizes an iterative approach to solve for these values of $m$ and $b$. By first letting $m$ in Equation 1 equal zero and solving the equation, a value of $b_1$ is obtained. This value of $b_1$ is then used in Equation 2 to obtain a value of $m_1$. As shown in FIG. 2 of the drawing, the values of $m$ and $b$ obtained in successive steps thus carried out converge to the values required to define the line interrelating $x$ and $y$ to best advantage.

Turning now to FIG. 3 of the drawing, the apparatus depicted therein is the analog equivalent of the process described in conjunction with FIG. 2. In FIG. 3, reference numeral 11 designates a variable source of voltage utilized in the apparatus to represent values of $b$, the $y$ intercept of the line best defining the linear relationship between variables $x$ and $y$. Source 11 may be a battery or other means for providing direct current voltage or may instead be an alternating current oscillator or the like. The actual values of the voltage derived from source 11 are not critical but should be variable over a relatively wide range. A variable resistor may be employed to alter the voltage from source 11 if a battery or similar source having a relatively constant voltage is employed. Variations in the voltage from an alternating or direct current source may in some cases be obtained by varying the gain of an amplifier. A source capable of delivering voltages in the range between about 10 volts and about 100 volts will ordinarily be satisfactory for purposes of the invention, although it will be understood that this range is merely illustrative and that the apparatus is not limited to use of a source having such a range.

A voltage source 12 similar to source 11 is utilized in the apparatus of FIG. 3 to represent values of $m$, the slope of the line best defining the linear relationship between variables $x$ and $y$. Source 12 may also be a source of either alternating current or direct current voltage but the output therefrom should be of the same type as that from source 11. Means are provided for varying the output from source 12 in a manner similar to those utilized to vary that from source 11. It will, of course, be recognized that in many cases a single voltage source provided with means for obtaining two separate variable outputs may also be utilized and will be preferred.

As can be seen from FIG. 3, source 12 is connected in a closed circuit with a resistor 13 provided with taps 14, 15, 16, 17, 18 and 19 which permit the derivation of voltages corresponding to slope $m$ multiplied by known values of the independent variable $x$ in the experimental data. Source 11 is connected in series with the circuit formed by source 12 and resistor 13, and hence the output therefrom is additive with respect to the output from source 12 as modified by resistor 13. The voltages obtained through taps 14 through 19 therefore represent values of $mx + b$ in the least squares equations. It will be recognized that in lieu of resistor 13 and taps 14 through 19, parallel, independent resistors could be employed for setting values of the independent variable $x$ into the analog system. The use of a single resistor such as resistor 13 shown in FIG. 3 is often advantageous, however, because the spacing of the taps thereon will correspond to the distances between $x$ values on a plot of the experimental data and hence setting of the $x$ values into the apparatus is facilitated.

Experimental values of the dependent variable $y$ are set into the analog apparatus shown in FIG. 3 of the drawing by means of a third voltage source 20 which, like sources 11 and 12, may provide either direct current or alternating current voltages. Again, a battery may be used if the apparatus is to be a direct current system; while an oscillator may be employed to provide alternating current voltages. One side of source 20 is connected to ground and the other side is connected to parallel resistors 21, 22, 23, 24, 25 and 26 which are in turn connected to ground. Each of the resistors is provided with a tap which permits a portion of the voltage across the resistor to be impressed upon one of a series of circuits in the apparatus corresponding to individual experimental values of dependent variable $y$. Since the experimental values of $y$ are thus assigned by setting the taps of resistors 21 through 26, rather than by varying the voltage output from source 20, the battery, oscillator or other device employed as source 20 may have a constant voltage output. The value of this output should, of course, be such that voltages representing known values of the dependent variable $y$ can be attained by merely adjusting the settings of resistors 21 through 26. In most cases, however, it will be preferred that source 20 be a variable voltage source.

Voltages indicating values of $mx + b$ thus obtained are subtracted from voltages corresponding to experimental values of $y$ for each point in the experimental data by means of subtracter circuits 27, 28, 29, 30, 31 and 32. Any of a variety of conventional subtracter circuits familiar to those skilled in the art may be employed for this purpose. The output voltage from each subtracter thus represents the value of $y - (mx + b)$ for the particular experimental data point to which the circuit including the subtracter corresponds. The output from subtracter 32 represents $y_1 - (mx_1 + b)$, that from subtracter 31 represents $y_2 - (mx_2 + b)$, and so forth. A value of $\Delta y$ for each of the experimental data points is thus provided.

The $\Delta y$ values obtained as described above are totaled by means of addition circuit 33, which may be any of a number of circuits familiar to those skilled in the electrical and electronics arts. The output from addition circuit 33 represents the sum of the $\Delta y$ values of the experimental data. This output is measured by meter 34 of conventional design. It is preferred that meter 34 be of the balancing type if direct current voltages are employed in the apparatus. The output from addition circuit 33 may have either positive or negative values and hence a meter which will permit direct reading of both is advantageous when direct current is used. If alternating current is employed, on the other hand, differences in the sign of the $\Delta y$ will be indicated by phase differences rather than by positive and negative values and hence a meter reading in only one direction may be employed.

Multipliers 35, 36, 37, 38, 39 and 40 are employed to obtain the product of $x$ and $\Delta y$ for each of the experimental data points. The voltages representing the $\Delta y$ values as obtained from subtracting circuit 27 through 32 are passed through multipliers 35 through 40 so that the output voltages therefrom represent values of $x$ times $\Delta y$. Multipliers 35 through 40 may be mechanically coupled with taps 14 through 19 so that they are automatically set to give the desired resistance by positioning the taps, as indicated by the dotted lines in FIG. 3 of the drawing. In lieu thereof, they may be manually set so that the output voltages are proportional to the product $x\Delta y$. The output voltages are then combined in addition circuit 41, similar to circuit 33, and the composite voltage representing the sum of the first moments of the deviations between $y$ values in the experimental data and corresponding $y$ values from the desired line is read on meter 42. As in the case of meter 34, meter 42 is preferably a null balance meter but may be a meter reading on one direction only.

A number of addition, subtraction and multiplier circuits suitable for use in the apparatus of the invention are described in detail in "Waveforms," volume 19 of the Massachusetts Institute of Technology Radiation Laboratory Series, published by the McGraw-Hill Book Company of New York.

In utilizing the apparatus shown in FIG. 3 of the drawing for the application for the least squares method to the problem of determining the equation of the straight line best defining the relationship between linearly related variables, taps 14 through 19 are positioned on resistor 13 so that the voltages across the taps will correspond to the product of $m$ times values of the independent variable $x$ in the experimental data. In like manner, the taps of resistors 21 through 26 are set so that voltages across each of the resistors will have values corresponding to the $y$ values of the experimental data. The voltage from source 12 is held at zero and that from source 11 is then varied until a zero reading is obtained on meter 34. The value of the voltage output of source 11 at this point corresponds to the value of $b$ in Equation 1 at the point $(o, b_1)$ where a line representing Equation 1 crosses the $x$ axis as shown in FIG. 2 of the drawing. Holding this value of the output voltage from source 11 constant, voltage is then applied to the apparatus from source 12 and is varied until a zero reading is obtained on meter 42. The value of the voltage from source 12 at this point corresponds to the value of $m_1$ in FIG. 2 at the point $(m_1, b_1)$. This value of voltage from source 12 is now held constant and the voltage output from source 11 is varied until a zero reading is again obtained on meter 34. This operation corresponds to a movement parallel to the $b$ axis in FIG. 2 from the previous point $(m_1, b_1)$ to a point $(m_1, b_2)$ where the line represented by Equation 1 is intersected. It can be seen from FIG. 2 that this latter point is nearer to the point where the lines represented by Equations 1 and 2 intersect than was the previous point. By alternately adjusting the voltages from sources 11 and 12 to obtain alternate zero readings on meters 34 and 42, the values of $m$ and $b$ converge to the point of intersection. The voltage outputs from sources 11 and 12 at this point correspond to values of the slope and the $y$ intercept of the straight line which best fits the experimental data represented by the values of $x$ and $y$ employed in the analog apparatus.

It will be apparent that the solution of the method of least squares by means of the apparatus shown in FIG. 3 of the drawing can be carried out much more readily than if manual computations are made. The appropriate values for $x$ and $y$ can rapidly be set into the analog apparatus and the voltage values can be quickly shifted until zero readings are obtained on both of the meters. The method and apparatus thus make possible significant savings in time when using the least squares method to fit a line to a set of experimental data points.

The method and apparatus described in conjunction with FIGURES 1 through 3 of the drawing can, as pointed out earlier, readily be extended to the derivation of parabolas and other curves represented by polynomial equations of the form $$y = a + bx + cx^2$$

It can be shown that the least squares equations for a curve of this type are as follows:

$$\Sigma \Delta y_i = \Sigma [y_i - (a + bx_i + cx_i^2)] = 0$$

$$\Sigma x_i \Delta y_i = \Sigma \{[x_i]\ [y_i - (a + bx_i + cx_i^2)]\} = 0$$

$$\Sigma x_i^2 \Delta y_i = \Sigma \{[x_i^2]\ [y_i - (a + bx_i + cx_i^2)]\} = 0$$

Considered as simultaneous equations in the coefficients $a$, $b$ and $c$, the above equations define three planes which intersect at a point where the values of the coefficients best interrelate experimental values of $x$ and $y$. This point can readily be located by an iterative method similar to that described above.

Since the apparatus shown in FIG. 3 of the drawing can be used to solve equations of the form $y = a + bx$, extension of that apparatus to solve the above polynomial equation is a simple matter. It is merely necessary to install a third source of variable voltage representing the coefficient $c$ and to provide for the measurement of quantities representing $$\Sigma [y_i - (a + bx_i + cx_i^2)],\ \Sigma \{[x_i]\ [y_i - (a + bx_i + cx_i^2)]\},$$

and $\Sigma \{[x_i^2]\ [y_i - (a + bx_i + cx_i^2)]\}$. Apparatus which permits the measurement of these quantities is shown in FIG. 4 of the drawing.

Turning now to FIG. 4, reference numerals 11 through 42 designate components discussed heretofore in conjunction with FIG. 3. It will be noted that an additional variable voltage source 43 for representing coefficient $c$ in the polynomial equation has been provided. This source is connected to parallel resistors 44 through 49 which have adjustable taps. By setting these taps to correspond to squared values of independent variable $x$, values of $cx^2$ are introduced into the analog apparatus. The voltages thus produced are added to voltages representing $a + bx$ obtained by means of voltage sources 11 and 12 and resistor taps 14 through 19. The necessary additions are performed in addition circuits 50 through 55. Combined voltages representing values of $$a + bx + cx^2$$

are then subtracted from voltages representing dependent variable $y$ values in subtracter circuits 27 through 32. This results in voltages corresponding to the quantities $[y - (a + bx + cx^2)]$. These are totaled in addition circuit 33 and their sum is measured by meter 34.

Multiplier circuits 35 through 40 serve to multiply the values of $[y - (a + bx + cx^2)]$ obtained from subtracters 27 through 32 by known values of the independent variable $x$. Voltages representing $\{[x]\ [y - (a + bx + cx^2)]\}$ thus obtained are totaled in addition circuit 41 and their sum is measured by meter 42.

An additional bank of multiplier circuits 56 through 61 is provided in the apparatus of FIG. 4 for obtaining voltages corresponding to the quantities $$\{[x^2][y-(a+bx+cx^2)]\}$$

The voltages from components 35 through 40 are multiplied by known values of the independent variable in these multiplier circuits. The output voltages thus obtained are then totaled in addition circuit 62 and their sum is measured by meter 63.

The apparatus shown in FIG. 4 of the drawing is employed in a manner analogous to that in which the apparatus of FIG. 3 is used. Values of two of the coefficients in the simultaneous equations in $a$, $b$ and $c$ are first assumed to be zero and a voltage representing the third is varied until a zero reading is obtained upon one of the voltmeters. The voltage resulting in this zero reading fixes a point on one of the three planes defined by the simultaneous equations. Additional points which eventually converge at the point where the three planes intersect are then located by alternately varying voltages representing the three coefficients to obtain alternate zero readings on the three meters. The point thus located defines the desired values of the coefficients $a$, $b$ and $c$. The curve containing those coefficients is the best curve fitting the polynomial equation that can be applied to the experimental data points.

It will be appreciated that in some cases variation of the voltage values to obtain zero readings on the meters may produce diverging rather than converging points. This presents no serious problem. When divergence occurs, differences between the voltage values required for successive zero reading increase and hence such a situation can be readily recognized. By starting the iterative process with a different variable and obtaining a zero reading on a different meter from that previously first used, a series of converging points can be obtained.

As pointed out earlier, the apparatus represented in FIG. 4 of the drawing permits the method of the invention to be applied to the derivation of parabolas and similar curves by the method of least squares. The apparatus of FIG. 4 can, of course, also be utilized for the derivation of straight lines. If the experimental data to which a curve is to be fitted are linearly related, the value of coefficient $c$ in the polynomial equation will be zero and hence a straight line will be obtained. By using logarithmic values of variables $x$ and $y$ in place of the straight arithmetic values obtained from the experimental data, a variety of curves represented by power functions can also be derived. These and other mathematical methods for increasing the usefulness of the method and apparatus of the invention will be apparent to those skilled in the art.

Numerous modifications in the specific components of the apparatus disclosed herein may be made without departing from the scope of the invention. In lieu of using a straight direct current or alternating current voltage, a square wave or similar type of voltage may be employed. So long as the voltage components in the system are additive, the particular type of voltage utilized is not critical. A variety of methods may be employed for varying the voltages. The precise method utilized will obviously depend in part upon the type of voltage and the voltage source which are used. Many different circuits suitable for this purpose will suggest themselves to those skilled in the art. Addition, subtraction and multiplication circuits of various conventional types may be employed. In view of the many modifications which will thus be apparent to those familiar with electrical and electronic apparatus used for analog purposes, it is intended that the invention be limited only by the scope of the appended claims.

What is claimed is:

1. An analog process for carrying out the method of least squares to define the curve best fitting a set of experimental data which comprises representing deviations between values of the depedent variable from said data and corresponding values of the dependent variable in terms of the general equation of said curve by a first series of voltages, representing the first moments of said deviations by a second series of voltages, and thereafter varying said first and second series of voltages to reflect variations in the coefficients of said equation until said first and second series each total zero simultaneously.

2. A process as defined by claim 1 wherein the second moment of said deviations is represented by a third series of voltages and said first, second and third series of voltages are varied until all total zero simultaneously.

3. An analog process for determining the coefficients of the polynomial equation best defining the relationship between two variables in a set of data which comprises representing deviations between values for the dependent variable from said data and corresponding values of the dependent variable expressed in terms of the independent variable by a first series of voltages, representing the products of each of said deviations times the corresponding value of the independent variable by a second series of voltages, representing the products of each of said deviations times the square of the corresponding value of the independent variable by a third series of voltages, varying said voltages to reflect a sequence of assumed values for the coefficients of said equation, and measuring the voltage components representing said coefficients which make each of said series of voltages total zero simultaneously.

4. An analog method for determining the slope and intercept of the line best defining the relationship between two variables in a set of data which comprises representing said slope and intercept by variable voltages; adding said voltages to produce a first series of voltages representing deviations between values of the dependent variable in said data and corresponding values of the dependent variable expressed in terms of said slope and intercept and a second series of voltages representing the products of said deviations times corresponding values of the independent variable, thereafter varying said voltages representing the slope and intercept until said first and second series of voltages total zero simultaneously, and measuring the voltages representing the slope and intercept.

5. An analog process for determining the equation of the straight line best interrelating two variables represented by a set of data which comprises representing the slope and intercept of said line by variable voltages, adding said voltages to produce a first series of voltages representing values of the dependent variable on said line in terms of known values of the independent variable and said slope and intercept, subtracting voltages in said first series from corresponding voltages in a second series representing known values of said dependent variable, totaling the differences between said first and second series of voltages, multiplying the differences between said first and second series by known values of said dependent variable, to obtain a third series of voltages, totaling said third series of voltages, and then alternately adjusting the voltage representing said slope and that representing said intercept until said totaled voltages equal zero simultaneously.

6. Analog apparatus for carrying out the method of least squares comprising a first source of variable voltage, a first impedance means connected in a closed circuit with said first source and having a first plurality of taps for obtaining a first series of voltages from said first source, a second source of variable voltage connected in series with the circuit formed by said first source and said first impedance means, a third source of voltage, a second impedance means connected in a closed circuit with said third source, and having a second plurality of taps for obtaining a second series of voltages from said third source, a plurality of subtracting means for subtracting voltages in said first series from voltages in said second series, a first addition circuit operatively connected for totaling the output voltages from said substracting means, a meter connected in series to said first addition circuit, a plurality of multiplier circuits operatively connected for obtaining the product of the output voltages from said first plurality of taps and said subtracting means, a second addition circuit operatively connected for totaling the output voltages from said multiplier circuits, and a second meter in series with said second addition circuit.

7. Apparatus as defined by claim 6 wherein said voltage sources are sources of direct current voltage.

8. Apparatus as defined by claim 6 wherein said voltage sources are sources of alternating current voltage.

9. Apparatus as defined by claim 6 wherein said meters are null balance meters.

10. Analog apparatus comprising a first source of voltage, a resistor in a closed circuit with said first source, and having a series of taps, a second source of voltage connected in series with the circuit formed by said resistor and said first source, a third source of voltage, a plurality of parallel potentiometers in series with said third source, a plurality of subtraction circuits connected between said taps and said potentiometers, a first addition circuit connected to the output terminals of said subtraction circuits, a first meter in series with said first addition circuit, a plurality of parallel multiplier circuits connected between the output terminals of said subtraction circuits and said taps, a second addition circuit connected to the output terminals of said multiplier circuits, and a second meter in series with said second addition circuit.

11. Apparatus as defined in claim 10 wherein said sources of voltage comprise oscillators.

12. Apparatus as defined in claim 10 wherein said sources of voltage comprise batteries.

References Cited in the file of this patent

UNITED STATES PATENTS

| | | |
|---|---|---|
| 2,557,070 | Berry | June 19, 1951 |
| 2,752,091 | McKenney et al. | June 26, 1956 |